United States Patent [19]

Peuser et al.

[11] 4,394,356

[45] Jul. 19, 1983

[54] RECUPERATION OF CYANIDES FROM RINSING SOLUTIONS OF CYANIDRIC PROCESSES FOR ELETRODEPOSITION OF METALS

[76] Inventors: Michael F. Peuser, Rua Princesa Isabel, 266, Apto 181, Sao Paulo 04601; Jose B. Bartolo, Nicolau-210-Diadema, San Paulo 09900, both of Brazil

[21] Appl. No.: 285,222

[22] PCT Filed: Jan. 18, 1980

[86] PCT No.: PCT/BR80/00002

§ 371 Date: Sep. 25, 1980

§ 102(e) Date: Sep. 25, 1980

[87] PCT Pub. No.: WO80/01563

PCT Pub. Date: Aug. 7, 1980

[51] Int. Cl.³ .......................... C01C 3/08; C02F 1/58
[52] U.S. Cl. ...................................... 423/43; 423/101; 423/143; 423/364; 423/371; 210/904; 210/912
[58] Field of Search ................... 423/371, 42, 43, 101, 423/29, 143, 364, 367; 210/DIG. 31, 904

[56] References Cited

U.S. PATENT DOCUMENTS

| 1,614,523 | 1/1927 | Cooper | 423/371 |
| 2,845,330 | 7/1958 | Zabban | 423/43 |
| 3,736,239 | 5/1973 | George | 423/43 |

FOREIGN PATENT DOCUMENTS

| 45-10905 | 4/1970 | Japan | 210/DIG. 31 |
| 50-656 | 1/1975 | Japan | 210/DIG. 31 |
| 528265 | 9/1976 | U.S.S.R. | 210/DIG. 31 |

OTHER PUBLICATIONS

*Sewage and Industrial Wastes*, vol. 22, No. 9 (Sep. 1950) pp. 1192–1199 (Milne).

*Primary Examiner*—Brian E. Hearn
*Attorney, Agent, or Firm*—Wilmer Mechlin

[57] ABSTRACT

Process for the recuperation of an insoluble salt of a metal from the rinsing solution of an electrodeposition of the metal.

3 Claims, No Drawings

RECUPERATION OF CYANIDES FROM RINSING SOLUTIONS OF CYANIDRIC PROCESSES FOR ELETRODEPOSITION OF METALS

TECHNICAL FIELD

This report concerns a simple process for precipitation, recuperation and re-use of cyanides from rinsing solutions, allowed in the industrial methods for the electrodeposition of metals. It is in the electroplating plant of industry that more economical and practical systems and methods are sought for the purifying treatment of rinsing solutions. The work developed in this sector of electrochemistry is rather complicated and requires specialized personnel trained for the use of the equipment employed; it is expensive due to high costs of energy and specialized labour. The large amount of chemical products lost in the electroplating industry is common knowledge, creating, as a result of treatment for destroying poisons, high, heavy metal content slurries, which will be lost.

The Recuperation of Cyanides from Rinsing Solutions of Cyanidric Processes for Electrodeposition of Metals serves to disperse with chemical products in the treatment of the cyanide bearing rinsing solutions, transforming the soluble cyanide into insoluble cyanide, thus allowing their removal through filtration or deposition. The insoluble cyanide may, therefore, be easily re-used industrially. The process referred to, by inclusion on the technical side of electrochemistry, represents an innovation over the traditional processes for the treatment of residues originating in electroplating processes.

BACKGROUND ART

Everyone in the trade knows that the treatment of cyanide bearing rinsing solutions is attained mainly through the poison elimination process by destruction of the cyanide. Another known process, the recycling, is based upon the evaporation of the solvent in the rinsing solutions, by using energy to concentrate the fluid which will be re-used in the respective dips. other processes are also known which use ion exchangers, involving high capital investment for equipment and the loss of chemical products through their destruction.

DISCLOSURE OF THE INVENTION

The process which is now proposed allows the total precipitation of the cyanides in the insoluble form, together with the cyanide metals and their recuperation for industrial re-use.

According to the amount of cyanide in the rinsing solutions, adequate quantities of metallic salts shall be added; these will correspond to the metal associated with the cyanide in the rinsing solution and in the electroplating dip. As an example, the zinc sulphate and/or chloride for rinsing solutions of the cyanidric zinc dip, or else the copper sulphate and/or chloride for the rinsing solution of the cyanidric copper dip, associated with acid or alkaline salts which control the pH value of the rinsing solution and the valency of the metallic ions, according to the type of metal, thus obtaining a full transformation of all the free cyanide and cyanides associated in complex salts to a simple metallic cyanide, insoluble in water with an adequate pH in the rinsing solutions, without releasing cyanidric gases.

All the cyanide in the water is thus transformed into an insoluble salt, and may be removed from the rinsing solution through deposition or filtration.

By using for each type of metal in the electrodeposition of metals process separate rinsing tanks without danger of intermixing metals, the metallic cyanides precipitated by means of the proposed process, that is the RECUPERATION OF CYANIDES FROM RINSING SOLUTIONS OF CYANIDRIC PROCESSES FOR ELECTRODEPOSITION OF METALS, may be directly re-used in the respective dips after their rinsing (the insoluble precipitate) in the filters or by deposition with water, until the rinsing water attains a density of 1.000 or 0° Be, thus releasing the precipitated cyanide from the other soluble components. The same process presented may also be used for the precipitation and/or recuperation of cyanide from any cyanidric liquid already used in the electroplating of zinc, cadmium, copper, silver, gold and their alloys.

The initial experiments have already demonstrated the simplicity of the RECUPERATION OF CYANIDES FROM RINSING SOLUTIONS OF CYANIDRIC PROCESSES FOR ELECTRODEPOSITION OF METALS, where there is no need for epecialized technical personnel, nor special equipment; neither does it consume chemical products for later destruction. It reclaims efficiently the valuable chemical products from the waters, where the value of the metallic salt used for the precipitation and recuperation is two to six times lower than the reclaimed material.

BEST MODE OF CARRYING OUT THE INVENTION

To demonstrate the technical and economic value of the process for RECUPERATION OF CYANIDES FROM RINSING SOLUTIONS OF CYANIDRIC PROCESSES FOR ELECTRODEPOSITION OF METALS, it will be exemplified in two cases:

| First case: Cyanidric zinc dip, with the following formulation: | | |
|---|---|---|
| 60 g/liter of zinc cyanide at | Cr$ 130,00/kg = | Cr$ 7,80 |
| 50 g/liter of sodium cyanide at | Cr$ 100,00/kg = | Cr$ 5,00 |
| 70 g/liter of caustic soda at | Cr$ 18,00/kg = | Cr$ 1,26 |
| One liter of zinc dip | | Cr$ 13,06 |

When one liter of the zinc dip is flushed to the rinsing tank, the following materials are needed to precipitate the soluble cyanide and part of the sodium hydroxide (caustic soda):

200 g of zinc sulphate at Cr$ 14,00/kg=Cr$ 2,80
The value of the recuperation and precipitated material afterwards is:

| 120 g of zinc cyanide at | Cr$ 130,00/kg = | Cr$ 15,60 |
|---|---|---|
| 16 g of zinc hydroxide at | Cr$ 40,00/kg = | Cr$ 0,64 |
| Value of recuperated material | | Cr$ 16,24 |

This means that the value of the recuperated material is 5.8 times the value of the material used for the recuperation. The water after this treatment presents no cyanides, no heavy metals and there remains only sodium sulphate and traces of sodium hydroxide, which are easily neutralized.

| Second case: Cyanidric copper dip, with the following formulation: | | |
|---|---|---|
| | | Cr$ |
| 60g/liter of copper cyanide | at Cr$ 180,00 p/kg = | 10,80 |
| 81g/liter of sodium cyanide | at Cr$ 100,00 p/kg = | 8,10 |
| 15g/liter of sodium hydroxide | at Cr$ 18,00 p/kg = | 0,27 |
| One liter of copper dip | = | 19,17 |

Therefore, a liter of copper dip when flushed to the rinsing tank needs the following amount of materials to precipitate the soluble cyanide:

161 g of copper chloride at Cr$ 111,60 p/kg=Cr$ 17,96

The value of the recuperated and precipitated material will then be the following:

210 g of copper cyanide at Cr$ 180,00 p/kg=Cr$ 37,80

The value of the reclaimed material is therefore 2.1 times the value of the metallic salt used for the recuperation. The water after the treatment has no cyanides and no heavy metals, and there remains only the sodium chloride, which is no problem for the water treatment.

The two cases given above give a good demonstration of the technical and economic value of the RECUPERATION OF CYANIDES FROM RINSING SOLUTIONS OF CYANIDRIC PROCESSES FOR ELECTRODEPOSITION OF METALS.

The traditional processes for the treatment of cyanide bearing waters show the following values concerning the usage of chemical products for the destruction of the unreclaimable cyanides:

| First case: For one liter of zinc bath dip: | | |
|---|---|---|
| 360 g of chloride | = | Cr$ 2,88 |
| 410 g of sodium carbonate | = | Cr$ 7,38 |
| Total | | Cr$ 10,26 |
| Second case: For one liter of copper dip: | | |
| 430 g of chloride | = | Cr$ 3,44 |
| 490 g of sodium carbonate | = | Cr$ 8,82 |
| Total | | Cr$ 12,26 |

These expenditures do not yet include the cost of filtering and separating the slurry, the capital investment for equipment and the running expenses for storage of these residues in adequate locations.

INDUSTRIAL APPLICABILITY

In these comparisons, the physical values are constant internationally; the values in money may show up in relation to the cost of the chemical products per country. The monetary values must be considered for comparisons, and the approximate equivalent in Brazil of one United States Dollar is thirty cruzeiros: (1.00=Cr$ 30,00).

In most countries, the copper, the zinc, the cadmium, the silver, the gold and cyanides are imported materials, thus justifying avoidance of the loss of these products in the rinsing solutions of the electroplating industry.

The electroplating industry is up against problems concerning the compliance with the standards of public organs, which are responsible for the preservation and protection of the ecology. They demand an efficient and complete treatment of the industrial effluent waste products.

The high toxicity of cyanides is well known and, therefore, the necessary and strict controls by public organs over the electroplating industry are well justified.

The process for RECUPERATION OF CYANIDES FROM RINSING SOLUTIONS OF CYANIDRIC PROCESSES FOR ELECTRODEPOSITION OF METALS is thus the only one which allows the treatment of waste waters with cyanides with profit to the users through the recuperation of the material via visual control of the treatment, thus eliminating the necessity for high costing equipment, avoiding any aggression on ecology.

The RECUPERATION OF CYANIDES FROM RINSING SOLUTIONS OF CYANIDRIC PROCESSES FOR ELECTRODEPOSITION OF METALS may also be a technique which can be applied to sundry other processes or recuperation of cyanides, the importance of which for the chemical and electrochemical industries in all countries needs no discussion.

The following four chemical formulae demonstrate the development of the reactions of the insoluble copper cyanide with the potassium cyanide dissolved to form the complex salt of soluble copper cyanide, demonstrating furthermore how the complex soluble copper cyanide by the addition of copper chloride transforms itself into the insoluble copper cyanide at the rinsing solution treatment stage:

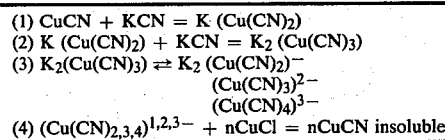

In formula four, there would be no difficulty in exchanging the copper chloride for copper sulphate.

By using the insoluble zinc cyanide with the sodium cyanide in the assembly of the zinc dips, we would obtain the soluble complex salt zinc cyanide which may be precipitated with zinc sulphate at the rinsing solution treatment stage according to the formulation:

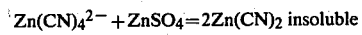

The precipitation formulation may be generalized considering as -M- the symbol of a metal, the atomic weight of which is between 60 and 200, thus allowing the objective of the recuperation of the cyanides and the respective metals in the rinsing solutions.

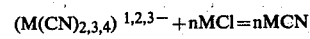

The technical and economic importance represented by the precipitation of cyanides from rinsing solutions from cyanidric processes for electrodeposition of metals may, thus, be seen by the addition of metallic salts along with salts and/or acids to correct the pH value of the water and associated with salts, gases and/or acids to correct the valency of metallic ions, when necessary.

We claim:

1. A process for recuperation of a cyanide from a rinsing solution of a cyanidric process for electrodeposition of copper, the solution containing a soluble complex cyanide of an alkali metal and copper, comprising adding to the solution a soluble simple salt of bivalent copper reacting with said complex cyanide and any free cyanide ions in said solution to form and precipitate an insoluble cyanide of copper, and separating said precipitant for reuse, said precipitation, being conducted without using hydrochloric acid by adding sodium bisulfite to the solution to reduce the pH of the solution to between 1.5 and 4.0 and the copper ion of the simple salt to a cuprous state for precipitating insoluble cuprous cyanide.

2. A process according to claim 1, wherein the added salt is a salt of copper and a strong acid.

3. A process for recuperation of a cyanide from a rinsing solution of a cyanidric process for electrodeposition of cadmium, the solution containing a soluble complex cyanide of an alkali metal and cadmium, comprising conducting the process in two stages, in a first whereof the solution is diluted to a cadmium content below 17 g/l, a soluble salt of zinc and a strong acid is added to the diluted solution to precipitate insoluble zinc cyanide, and the precipitate is separated from the solution, and in the second stage adding to the solution from the first stage an alkali compound reacting with cadmium ions in the solution to form and precipitate an insoluble cadmium salt, and separating the precipitate.

* * * * *